(12) United States Patent
Crawford

(10) Patent No.: US 12,078,290 B2
(45) Date of Patent: Sep. 3, 2024

(54) ARTICLE FOR MOUNTING ON AN INCLINED OR VERTICAL SURFACE

(71) Applicant: Camie Crawford, Meridian, ID (US)

(72) Inventor: Camie Crawford, Meridian, ID (US)

( * ) Notice: Subject to any disclaimer, the term of this patent is extended or adjusted under 35 U.S.C. 154(b) by 0 days.

(21) Appl. No.: 18/335,711

(22) Filed: Jun. 15, 2023

(65) Prior Publication Data

US 2023/0332736 A1 Oct. 19, 2023

Related U.S. Application Data

(63) Continuation of application No. 17/723,417, filed on Apr. 18, 2022, now abandoned.

(60) Provisional application No. 63/176,163, filed on Apr. 16, 2021.

(51) Int. Cl.
*A47G 29/122* (2006.01)
*F16M 13/02* (2006.01)

(52) U.S. Cl.
CPC ......... *F16M 13/02* (2013.01); *A47G 29/1223* (2013.01)

(58) Field of Classification Search
CPC ............ A47G 29/1223; B65D 2313/02; B65D 2313/08; B65D 33/14; F16M 13/02
See application file for complete search history.

(56) References Cited

U.S. PATENT DOCUMENTS

| | | | | |
|---|---|---|---|---|
| 4,069,965 A | * | 1/1978 | Maddox, Jr. | A47G 29/1223 248/101 |
| 4,776,512 A | * | 10/1988 | Moore, Sr. | A47G 29/1223 248/101 |
| 5,368,226 A | * | 11/1994 | Franceschino | A47G 29/1223 232/19 |
| 2009/0184159 A1 | * | 7/2009 | Crawford | A47G 29/12 232/19 |

* cited by examiner

*Primary Examiner* — Bradley Duckworth
(74) *Attorney, Agent, or Firm* — Superior IP, PLLC; Dustin L. Call

(57) ABSTRACT

An article for mounting on an inclined or vertical surface includes at least one piece of reclosable fastener material, collectively comprising a plurality of apertures formed therein; and at least one pocket, located within the article behind said piece(s) of reclosable fastener material, each of the apertures providing a respective passageway from the pocket(s) to an exterior of the article. Each aperture permits a head of an elongate fastener to be inserted therethrough, so that the elongate fastener can be retained within the pocket(s), and the plurality of apertures thereby allowing the article to hang from a plurality of elongate fasteners that have been driven into the surface.

19 Claims, 3 Drawing Sheets

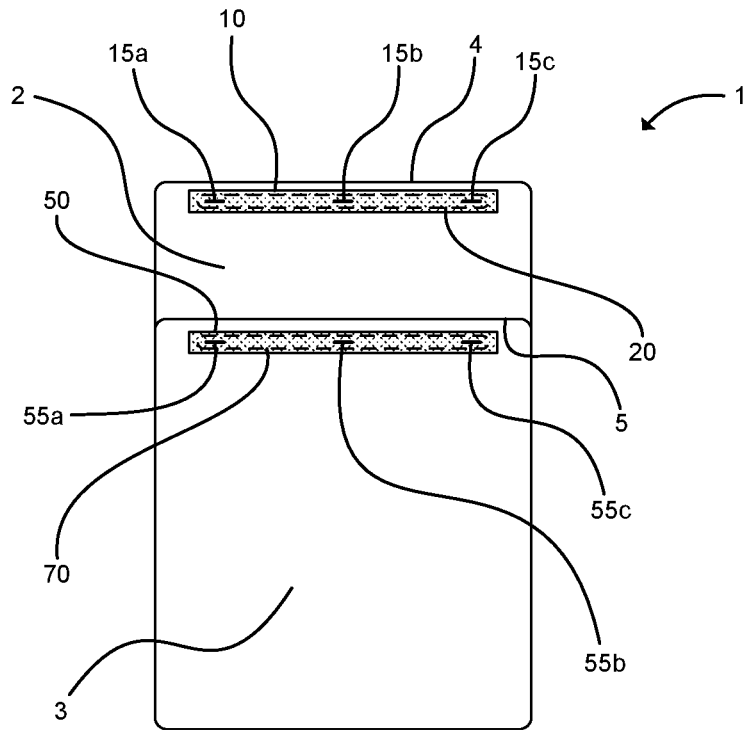
Figure 1A
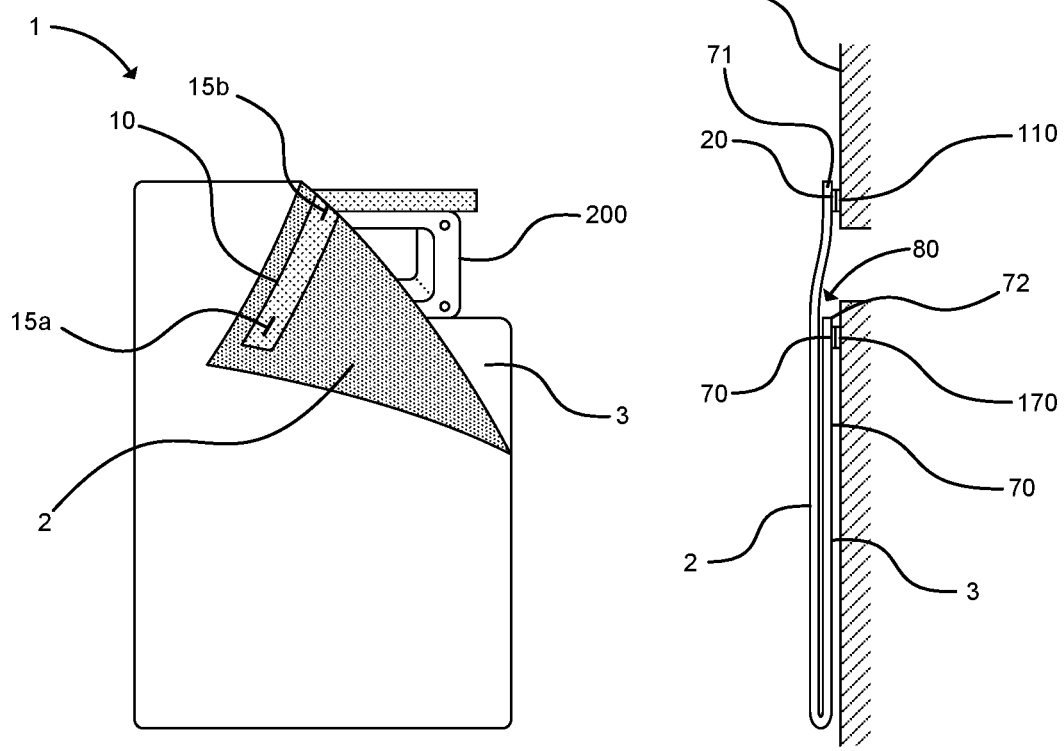
Figure 1B
Figure 1C

ARTICLE FOR MOUNTING ON AN INCLINED OR VERTICAL SURFACE

CROSS-REFERENCE TO RELATED APPLICATIONS

This application claims the benefit of and priority to U.S. Provisional patent application Ser. No. 17/723,417 filed on Apr. 18, 2022, which application is incorporated herein by reference in its entirety.

Application Ser. No. 17/723,417 claims the benefit of and priority to U.S. Provisional Patent Application Ser. No. 63/176,163 filed on Apr. 16, 2021, which application is incorporated herein by reference in its entirety.

BACKGROUND OF THE INVENTION

Field of the Invention

The present disclosure relates to articles for mounting on an inclined or vertical surface, for example on a wall or door, a vertical/inclined surface of furniture, cabinetry and the like, or a vertical/inclined surface within a vehicle, as well as to kits comprising such articles. In specific examples, the disclosure relates to articles for mounting on doors or walls in a domestic setting, that is, within a user's home. The disclosure may also be applied within a business, recreational, or other setting.

Description of the Related Technology

To securely mount an article on an inclined or vertical surface may require special tools or skills. This may result in some potential users being unable to mount such articles altogether, because they lack the requisite tools and/or skills, or may result in such articles being mounted only loosely and hence being prone to falling off the surface or becoming damaged, particularly where force is applied, e.g. by a pet or child, or by an item held within the article.

SUMMARY

According to a first aspect of the disclosure, there is provided an article for mounting on an inclined or vertical surface, comprising: at least one piece of reclosable fastener material, collectively comprising a plurality of apertures formed therein; and at least one pocket, located within the article behind said piece(s) of reclosable fastener material, each of said apertures providing a respective passageway from the pocket(s) to an exterior of the article, wherein each aperture permits a head of an elongate fastener to be inserted therethrough, so that said elongate fastener can be retained within said pocket(s), said plurality of apertures thereby allowing the article to hang from a plurality of elongate fasteners that have been driven into said surface.

According to a further aspect of the disclosure, there is provided a kit comprising: an article for mounting on an inclined or vertical surface, which comprises: at least one piece of reclosable fastener material, collectively comprising a plurality of apertures formed therein; and at least one pocket, located within the article behind said piece(s) of reclosable fastener material, each of said apertures providing a respective passageway from the pocket(s) to an exterior of the article, wherein each aperture permits a head of an elongate fastener to be inserted therethrough, so that said elongate fastener can be retained within said pocket(s), said plurality of apertures thereby allowing the article to hang from a plurality of elongate fasteners that have been driven into said surface; and at least one piece of reclosable fastener material, having a first side configured to fasten to at least one piece of reclosable fastener material on the article.

Further features and advantages will become apparent from the following description, given by way of example only, which is made with reference to the accompanying drawings.

BRIEF DESCRIPTION OF THE DRAWINGS

Further features will become apparent from the following description, given by way of example only, which is made with reference to the accompanying drawings, in which:

FIG. 1A shows a front view of an example of an article for mounting to a vertical surface in accordance with a first example embodiment of the present disclosure;

FIG. 1B shows a rear view of the article of FIG. 1A, when mounted on the vertical surface of a door with the aid of reclosable fastener strips attached to the door's surface;

FIG. 1C shows a side, cross-sectional view of the article of FIG. 1A, when mounted on the vertical surface of a door with the aid of reclosable fastener strips attached to the door's surface;

DETAILED DESCRIPTION

Figure 2:
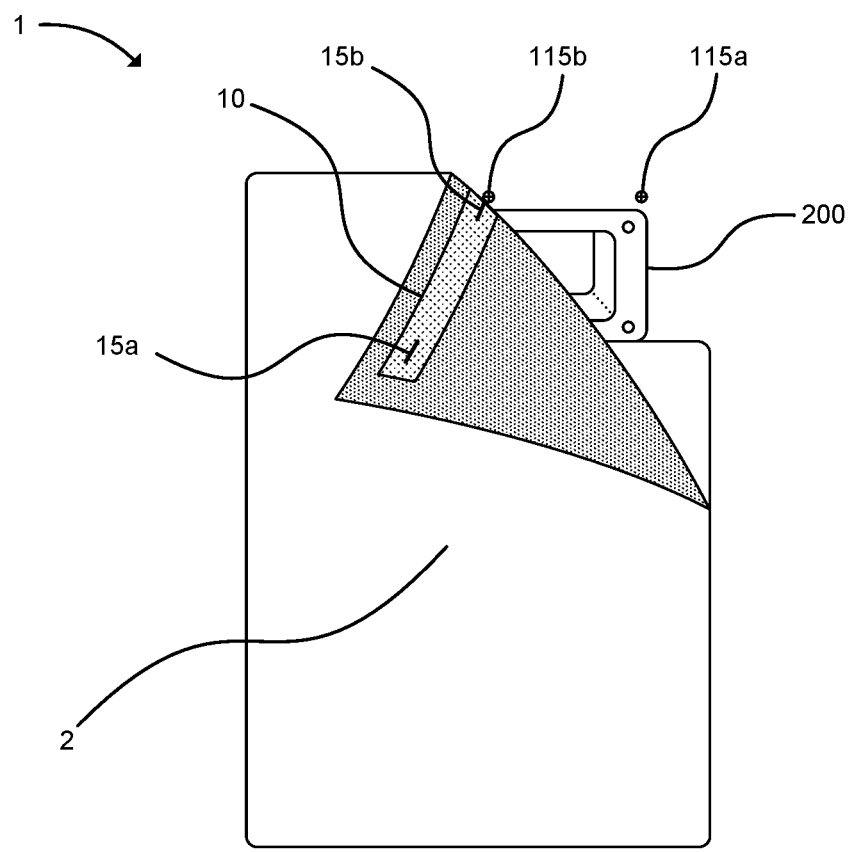
FIG. 2 shows a rear view of the article of FIG. 1A, when mounted on the vertical surface of a door with the aid of screws that have been driven into the door.

Details of apparatus and kits according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein relate to articles for mounting on an inclined or vertical surface and kits including such articles.

Attention is directed firstly to FIG. 1A, which shows a front view of an example of an article 1 for mounting to a vertical surface 100, in accordance with an example embodiment of the present disclosure.

As shown, the article 1 includes a piece of reclosable fastener material 10, in which a plurality of apertures 15a-15c have been formed, for example by cutting, drilling or the like. As may also be seen, the article 1 further includes a pocket 20, which is located within the article, behind the piece of reclosable fastener material 10. The apertures 15a-15c and pocket 20 are arranged such that each of said apertures 15a-15c provides a respective passageway from the pocket 20 to an exterior of the article. The significance of this arrangement is described below with reference to FIG. 2.

In the particular example shown, the piece of reclosable fastener material 10 is a strip, i.e. is elongate (though this is by no means essential and the piece of reclosable fastener material 10 could instead be square or circular). More particularly, the length of the strip 10 extends parallel to an edge 4 of the article 1, although this is by no means essential.

Various types of reclosable fastener material are considered to be suitable. For example, hook and loop fastener material (e.g. Velcro®) could be used. In further examples, slidingly engaging fastener material, or 3M™ Dual Lock™ reclosable fastener material could be used.

As noted above, the present disclosure concerns articles that are configured to be mounted on an inclined or vertical surface. In the particular example shown in FIGS. 1A-2, the article 1 is configured to be mounted to the interior surface 100 of a door, around a mail slot 200. However, articles 1 as described herein may be configured for mounting to other vertical/inclined surfaces, such as walls, vertical/inclined surfaces of furniture, cabinetry and the like, or vertical/inclined surfaces within vehicles or other locales.

In general, an article according to the present disclosure may, for example, comprise, or be configured as, a bag, sack, container or the like, capable of holding items. In the particular example shown in FIGS. 1A-2, the article 1 is configured as a sack for receiving and holding mail items. Hence, or otherwise, the article may be configured to be mounted over a mail slot 200, so that it can receive mail items that are pushed through the mail slot 200. However, as an alternative, articles according to the present disclosure may be comprise, or be configured as, storage containers for holding miscellaneous household items. Indeed, the teaching of this disclosure may be applied still more generally, and hence the article could instead be a tapestry, banner or curtain panel.

Attention is now directed to FIGS. 1B-1C and 2, which illustrate two options that the user is provided with for mounting the article to the vertical/inclined surface 100 (in the illustrated example, the interior surface of a door with a mail slot 200).

The first option is illustrated in FIGS. 1B-1C, which show, respectively, a rear view and a side, cross-sectional view of the article of FIG. 1A, when mounted to the vertical/inclined surface 100. To show the mounting arrangement clearly, a corner of the article 1, which is adjacent aperture 15a, is shown unattached in the rear view of FIG. 1B; it will be appreciated that, when fully mounted, the corner will secured to the vertical/inclined surface 100.

In the mounting option illustrated in FIGS. 1B and 1C, the piece of reclosable fastener material 10 is fastened to one or more complementary pieces of reclosable fastener material 110 that have been attached to the vertical/inclined surface 100, for example by means of adhesive (e.g. where the complementary pieces of reclosable fastener material are self-adhesive). Such complementary pieces of reclosable fastener material 110 may be provided to the user as part of a kit 1000 that includes the article 1, for example as described below with reference to FIG. 3. The complementary pieces of reclosable fastener material 110 may have similar shapes to the piece of reclosable fastener material 10; for example, they may be elongate strips where the piece of reclosable fastener material 10 is shaped as an elongate strip.

The second option is illustrated in FIG. 2, which shows a rear view and a detailed perspective view of the article of FIG. 1A, when mounted to the vertical/inclined surface 100. To show the mounting arrangement clearly, a corner of the article 1, which is adjacent aperture 15a, is shown unattached in the rear view of FIG. 2, in a similar manner to FIG. 1B; it will be appreciated that, when fully mounted, the corner will be secured to the vertical/inclined surface 100.

In the mounting option illustrated in FIG. 2, the apertures 15a-15c in the piece of reclosable fastener material 10 receive the heads of respective elongate fasteners, such as screws or nails, which have been driven into the vertical/inclined surface 100. More particularly, the heads of the elongate fasteners are inserted through the apertures 15a-15c and received and held within the pocket 20 within the article. In this way, the article 1 is hangingly mounted upon the heads of such elongate fasteners.

It will therefore be appreciated that the article 1 of FIGS. 1A-2 affords the user the possibility of choosing a mounting option that they consider most suitable for their particular installation and preferences. For example, the user may be unwilling or unable to insert a fastener into a particular surface. For instance, they may not wish to leave a lasting hole in the surface, or they may not possess, or be comfortable using, suitable tools (particularly if the surface is formed of a hard material, such as metal, as might be the case with an exterior door). In such cases, the user might select the first option of mounting the article using one or more complementary pieces of reclosable fastener material 110 that have been attached to the vertical/inclined surface 100.

In other cases, the user may anticipate that the article will hold relatively heavy loads. For instance, in situations where the article is to receive and hold mail items, the user might be accustomed to receiving large volumes of mail and/or heavy packages. In such cases, the user might select the second option of hangingly mounting the article upon the heads of elongate fasteners (e.g. screws or nails) that have been driven into the vertical/inclined surface.

These are, of course, merely examples of reasons that a user might choose one mounting option over another; the general principle is that the user is able to select a mounting option in accordance with their needs and preferences. The user is therefore afforded greater flexibility, convenience and cost-effectiveness, when multiple options are present in one device, rather than having to purchase multiple devices over time. Similarly, it is more efficient and cost-effective to manufacture a single device with multiple mounting options, as compared with manufacturing multiple devices with only one mounting option.

Although the two mounting options presented above are described separately, it should be appreciated that, in some cases, the user could choose to implement both mounting options simultaneously. That is, the user might use both complementary pieces of reclosable fastener material and elongate fasteners, e.g. for a particularly secure mounting of the article 1.

Because reclosable fastener material is relatively rigid and strong, articles according to the present disclosure may allow for particularly secure mounting to inclined/vertical surfaces 100 by means of elongate fasteners. Such mounting may, for example, resist forces applied to the article 1 in multiple directions, without the article 1 falling off the vertical/inclined surface 100 and/or without the article 1 being damaged by such forces. It is thought that this may, in part, result from the relatively rigid reclosable fastener material hugging tightly to the heads of the elongate fasteners. An additional consequence of the relative rigidity of the reclosable fastener material is that the article may experience little, if any, sagging between adjacent apertures, where the article is mounted using the elongate fasteners. A user may further appreciate that it is not necessary to integrate hard pieces into/along with the recloseable fastener material; such as metal or hard plastic. Thereby decreasing risk of choking hazard to small children and pets and preventing damage to the inside of the user's washer/dryer if the product is made of a launderable material.

Although reclosable fastener material is relatively rigid, it is also found to be sufficiently flexible that the user can easily disengage the elongate fasteners from the apertures 15a-15c in order to remove the article 1 from the vertical/inclined surface 100. Moreover, the strength of reclosable fastener material may allow the user to engage and disengage the elongate fasteners from the apertures 15a-15c multiple times without causing significant wear on the article 1. This feature also allows for the user to remove and reattach the product without the use of tools and without stripping or enlarging the elongated fastener holes present within the mounting surface.

Returning to FIG. 2, it will be noted that the article 1 is configured to cover or conceal the head of each elongate fastener when inserted into one of the apertures 15a-15c and retained in the pocket 20. Hence, or otherwise, the head of each elongate fastener may be inaccessible from the side of the article opposite to that in which the apertures are formed. This may provide a "cleaner" appearance to the product and/or may reduce the risk that a person bumping into the elongate fastener knocks it out of place. Additionally, this will prevent disturbance to, and/or damage to, the front face of the product. Which may be of significant importance when the product is a tapestry, banner, or other form of artwork.

In some embodiments, such as that shown in FIGS. 1A-2, where the article comprises, or is configured as a sack, it may be described as having a mouth 80 for receiving items to be held by the sack. As best shown in FIG. 1C, the mouth 80 may open towards the inclined/vertical surface 100, when the article is mounted thereupon, so as to receive mail items pushed through the mail slot 200. However, in other examples, the mouth may open vertically upwards.

In embodiments, such as that shown in FIGS. 1A-2, where the article comprises, or is configured as, a sack, the mouth 80 of the sack may include a first lip portion 71, on which the piece of reclosable fastener material 10 is arranged. Such an arrangement of the piece of reclosable fastener material 10 relative to the mouth of the sack may enable the sack to securely hold items inserted therein. Various kinds of flexible material may be suitable for said sack. For example, the sack may be made from fabric, flexible plastic or flexible polymer material.

It may be noted that, in the specific example of an article 1 shown in FIG. 1A, the apertures 15a-15c are shaped as slits. Each slit may be shaped as a straight line, as shown, or might follow a curved or zig-zag path, or similar. Slit-shaped apertures may be suitable in at least some cases because they may grip the elongate fasteners tightly, leading to a secure mounting of the article 1 to the vertical/inclined surface 100. More generally, each aperture 15a-15c may be elongate; for example, each aperture could be a slot or a slit.

Returning to FIG. 1A, it may be noted that, in the particular example embodiment shown, the article 1 includes a second piece of reclosable fastener material 50. In general, as shown in FIG. 1A, the first and second pieces of reclosable fastener material 10, 50 may be configured similarly, having apertures and pockets with similar characteristics, although this is not essential.

Referring now to FIG. 1C, as noted above, the particular article 1 shown is configured as a sack having a mouth 80, with the first piece of reclosable fastener material 10 being arranged on a first lip portion 71 of the mouth 80. As shown in FIG. 1C, the second piece of reclosable fastener material 60 may, in some examples, be arranged on a second lip portion 72 of the mouth of the sack. Furthermore, as illustrated in FIG. 1C, the first and second lip portions 71, 72 may be arranged on opposite sides of the mouth. Such arrangements may enable the sack to be mounted to the vertical/inclined surface 100 securely and/or may enable the sack to hold items inserted therein securely.

Conveniently, the article 1 of FIGS. 1A-2 includes a folded sheet of flexible material 70 that provides the mouth 80 of the sack and the two lip portions 71, 72. As shown, the first and second pieces of reclosable fastener material 10, 50 are attached to the folded sheet, for example by sewing, adhesive, thermal bonding or the like. Various kinds of flexible material may be suitable for folded sheet 70. For example, the sheet may be made from fabric, flexible plastic or flexible polymer material. The folded sheet may consist of a single piece of material or be made up of multiple pieces joined together and the sides may be partially or wholly sealed along the edges. Alternatively, the finished product may consist of multiple parts devoid of a folded sheet yet still configured to create the same effect described above using recloseable fastener material affixed to lip portions and may consist of similar flexible material indicated above.

Returning to FIG. 1A, as illustrated therein, where the article 1 includes first and second pieces of reclosable fastener material 10, 50, these may, for example, be arranged at opposite edges 4, 5 of the article 1.

As is also shown in FIG. 1A, the second piece of reclosable fastener material 50 may, in some examples, be similar to the first piece of reclosable fastener material 10 in that it includes a plurality of apertures 55a-55c formed therein. However, this is not essential, and the second piece of reclosable fastener material 50 might, in other embodiments, not include any apertures. For example, in such embodiments, the second piece of reclosable fastener material 50 might be intended to fasten to one or more complementary pieces of reclosable fastener material that have been attached to the vertical/inclined surface 100.

As further shown in FIG. 1A, the second piece of reclosable fastener material 50 may, in some examples, be similar to the first piece of reclosable fastener material 10 in that it is elongate, with its length extending parallel to an edge 5 of the article 1. As is also shown in FIG. 1A, the first and second pieces of reclosable fastener material 10, 50 may, for example, be arranged at opposite edges of the article 1.

Figure 3:
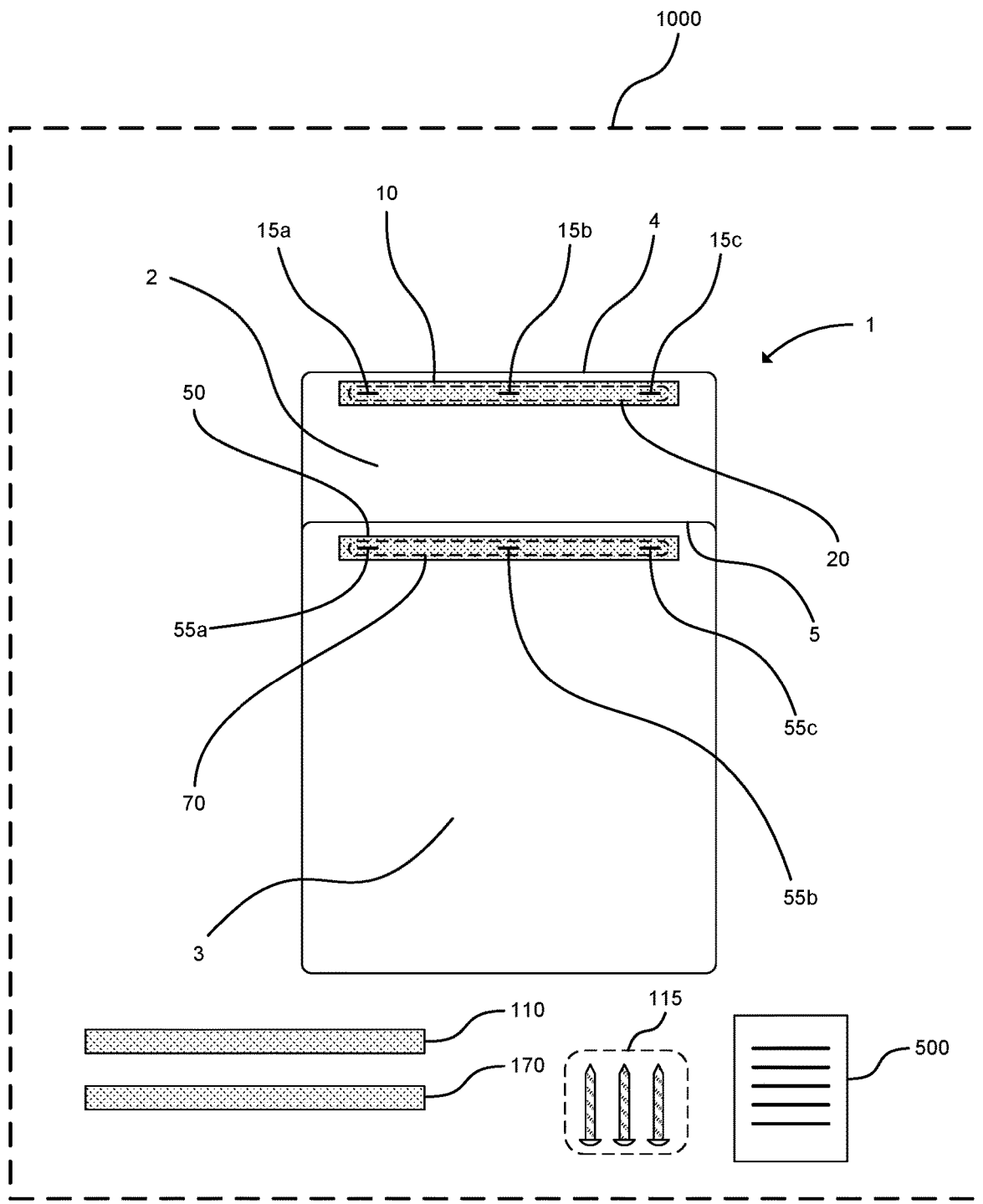
FIG. 3 is a schematic view of a kit according to a further aspect of the present disclosure, the kit including the article of FIG. 1A.

Attention is now directed to FIG. 3, which is a schematic view of a kit according to a further aspect of the present disclosure. As shown, the kit 1000 includes the article for mounting to an inclined/vertical surface 100 described above with reference to FIGS. 1A-2. As may be seen, the kit 1000 further includes at least one piece of reclosable fastener material 110, 170, having a first side configured to fasten to the piece of reclosable fastener material 10, 50 on the article 1. For instance, the kit 1000 may include a respective, complementary piece of reclosable fastener material for each piece of reclosable fastener material on the article 1, or may include multiple complementary pieces of reclosable fastener material for each piece of reclosable fastener material on the article 1. The opposing side of each complementary piece of reclosable fastener material may be configured to bond to the inclined/inclined surface 100; for example, it may comprise adhesive. Hence, or otherwise, each complementary piece of reclosable fastener material may be self-adhesive.

As also illustrated in FIG. 3, the kit 1000 may include a plurality of elongate fasteners configured to be inserted into the apertures 15a-15c, 55a-55c of the piece(s) of reclosable fastener material 10, 50 on the article 1, and retained within the corresponding pocket 20, 70 of the article 1. Additionally, or alternatively, the kit 1000 may include instructions 500 that direct the user to insert the heads of elongate fasteners into the apertures 15a-15c, 55a-55c of the article 1 in order to mount the article to an inclined or vertical surface 100. Such instructions 500 may indicate dimensions of elongate fasteners suitable for insertion into the apertures 15a-15c, 55a-55c of the article 1 and retention within the pocket(s) 20, 70 of the article 1.

In the description above it was mentioned that the elongate fastener could, for example, be a screw or a nail. These are considered suitable as they can be securely driven into a vertical or inclined surface around the home with only basic equipment that a customer is likely to already possess. It will however be understood that these are merely illustrative examples and that other types of elongate fastener may be suitable, depending on the particular circumstances.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An article for mounting on an inclined or vertical surface, comprising:
   at least one piece of reclosable fastener material, collectively comprising a plurality of apertures formed therein; and
   at least one closed pocket, wherein the closed pocket(s) are:
      sealed along at least two edges of the closed pocket(s); and
      located within the article behind said piece(s) of reclosable fastener material, each of said apertures providing a respective passageway from the pocket(s) to an exterior of the article,
      wherein:
         each aperture permits a head of an elongate fastener to be inserted therethrough, so that said elongate fastener can be retained within said pocket(s), said plurality of apertures thereby allowing the article to hang from a plurality of elongate fasteners that have been attached to said surface.

2. The article of claim 1, wherein each of said apertures is shaped as a slit or slot.

3. The article of claim 1, wherein the article is configured to cover the head of said elongate fastener when inserted into one of said apertures and retained in said closed pocket(s).

4. The article of claim 1, wherein the piece(s) of reclosable fastener material is (are) located at an edge of the article.

5. The article of claim 1, wherein the article comprises a bag, a sack or a container.

6. The article of claim 1, wherein the article comprises a sack having a mouth, the mouth comprising a first lip portion, on which said piece(s) of reclosable fastener material is (are) arranged.

7. The article of claim 6, wherein the article further comprises a second piece, or set of pieces, of reclosable fastener material, and the mouth comprises a second lip portion, on which said second piece, or set of pieces, of reclosable fastener material is (are) arranged, said first and second lip portions being arranged on opposite sides of said mouth.

8. The article of claim 7, wherein the article comprises a sheet of flexible material, to which said first and second pieces, or sets, of reclosable fastener material are attached, the sheet of flexible material being folded so as to provide the mouth and first and second lip portions.

9. A kit comprising:
   an article for mounting on an inclined or vertical surface, the article comprising:
      at least one piece of reclosable fastener material, collectively comprising a plurality of apertures formed therein; and
      at least one closed pocket, wherein the closed pocket(s) are:
         sealed along the totality of all edges of the closed pocket(s); and
         located within the article behind said piece(s) of reclosable fastener material, each of said apertures providing a respective passageway from the closed pocket(s) to an exterior of the article,
      wherein:
         each aperture permits a head of an elongate fastener to be inserted therethrough, so that said elongate fastener can be retained within said closed pocket(s), said plurality of apertures thereby allowing the article to hang from a plurality of elongate fasteners that have been attached to said surface; and
         the only opening into the closed pocket(s) includes said apertures; and
   at least one piece of reclosable fastener material, having a first side configured to fasten to at least one piece of reclosable fastener material on the article.

10. The kit of claim 9, further comprising a plurality of elongate fasteners configured to be inserted into said plurality of apertures and retained within said closed pocket(s).

11. The kit of claim 9, comprising instructions to insert the heads of elongate fasteners into said plurality of apertures in order to mount the article to an inclined or vertical surface.

12. The kit of claim 11, wherein said instructions indicate dimensions of elongate fasteners suitable for insertion into said plurality of apertures and retention within said closed pocket(s).

13. An article for mounting on an inclined or vertical surface, comprising:
   a sack, wherein the sack:
      includes:
         a mouth, the mouth comprising a first lip portion;
         a compartment, wherein the compartment is sealed along all edges of the compartment except the mouth, the mouth being the only opening into the compartment;
   at least one piece of reclosable fastener material, collectively comprising a plurality of apertures formed therein, wherein said piece(s) of reclosable fastener material is (are) arranged on said first lip portion; and
   at least one closed pocket, wherein the closed pocket(s) are:
      sealed along the totality of all edges of the closed pocket(s); and
      located within the article behind said piece(s) of reclosable fastener material, each of said apertures providing a respective passageway from the closed pocket(s) to an exterior of the article,
      wherein:
         each aperture permits a head of an elongate fastener to be inserted therethrough, so that said elongate fastener can be retained within said closed pocket(s), said plurality of apertures thereby allowing the article to hang from a plurality of elongate fasteners that have been attached to said surface; and the only opening into the closed pocket(s) includes said apertures.

14. The article of claim 13, wherein the compartment comprises a sheet of flexible material the sheet of flexible material being folded so as to provide the mouth and first lip portion.

15. The article of claim 13, wherein the mouth of the compartment is sealable.

16. The article of claim 13, wherein the at least one piece of reclosable fastener material includes a piece of fabric.

17. The article of claim 16, wherein the piece of fabric includes a portion of a hook and loop fastener.

18. The article of claim 17, wherein said apertures are slits in the piece of fabric.

19. The article of claim 18, wherein the pocket is sealed by stitching the piece of fabric to the first lip portion.

* * * * *